US007062584B1

(12) United States Patent
Worrell et al.

(10) Patent No.: US 7,062,584 B1
(45) Date of Patent: Jun. 13, 2006

(54) METHOD AND APPARATUS FOR SUPPORTING TWO DIFFERENT TYPES OF INTEGRATED CIRCUIT CARDS WITH A SINGLE CONNECTOR

(75) Inventors: Charles William Worrell, Carmel, IN (US); Yefim Vayl, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 466 days.

(21) Appl. No.: 10/030,788

(22) PCT Filed: Jul. 12, 2000

(86) PCT No.: PCT/US00/18893

§ 371 (c)(1), (2), (4) Date: Jan. 11, 2002

(87) PCT Pub. No.: WO01/06443

PCT Pub. Date: Jan. 25, 2001

Related U.S. Application Data

(60) Provisional application No. 60/143,843, filed on Jul. 15, 1999.

(51) Int. Cl.
*G06F 13/00* (2006.01)
*G06F 3/00* (2006.01)

(52) U.S. Cl. .................................... 710/301; 710/16

(58) Field of Classification Search ........ 710/300–304, 710/16, 105, 305
See application file for complete search history.

(56) References Cited

U.S. PATENT DOCUMENTS

| 5,375,084 A * | 12/1994 | Begun et al. ............... 365/63 |
| 5,675,654 A | 10/1997 | Ryan ............................ 380/48 |
| 5,712,472 A * | 1/1998 | Lee ............................. 235/486 |
| 5,754,646 A * | 5/1998 | Williams et al. ............... 705/55 |
| 5,847,372 A * | 12/1998 | Kreft .......................... 235/492 |
| 6,601,238 B1 * | 7/2003 | Morrison et al. ............. 725/50 |
| 2002/0188886 A1 * | 12/2002 | Liu et al. ....................... 714/6 |

FOREIGN PATENT DOCUMENTS

| DE | 19523275 | 12/1996 |
| EP | 0409241 | 1/1991 |
| EP | 0513507 | 11/1992 |
| EP | 0733987 | 9/1996 |

OTHER PUBLICATIONS

"The Design of a Smart Card Interface Device", Chapter 4: The ISO 7816 Standard, pp. 1-9, http://www.cs.uct.ac.za/Research/DNA/SOCS/rchap4.html.*
"ISO 7816-3 Smart Card Standard: Part 3: Electrical Signals and Transmission Protocols", pp. 1-18, http://www.cardwerk.com/smartcards/smartcard_standard_ISO7816-3.aspx.*
"Pirate decryption", pp. 1-8, especially Section: ISO7816 smartcard terminology, http://www.answers.com/topic/pirate-decryption.*

* cited by examiner

*Primary Examiner*—Rehana Perveen
*Assistant Examiner*—Trisha Vu
(74) *Attorney, Agent, or Firm*—Joseph J. Laks; Robert D. Shedd; Paul P. Kiel

(57) ABSTRACT

A method and apparatus for implementing an interface for ISO/7816 and NRSS cards with a single connector. The apparatus is a computer controlled device comprising a card reader further comprising an interface controller and a connector. The connector forms the interface between the card reader and the IC card. The interface controller determines whether the IC card inserted into the card reader is an ISO/7816 or NRSS card. Additionally, the interface controller implements the correct interface for the detected IC card. The method comprises the steps of determining whether a IC card is an ISO/7816 or NRSS card and implementing an interface for the identified IC card.

11 Claims, 2 Drawing Sheets

| Contact# | ISO/7816 Assignment | NRSS Assignment |
|---|---|---|
| C1 | VCC (Supply Voltage) | VCC (Supply Voltage) |
| C2 | RST (Reset Signal) | RST (Reset Signal) |
| C3 | CLK (Clock Signal) | CLK (Clock Signal) |
| C4 | Reserved | NRSS Data Input |
| C5 | GND (Ground) | GND (Ground) |
| C6 | VPP (Programming Voltage) | NRSS Clock Signal |
| C7 | I/O (Data Input/Output) | I/O (Data Input/Output) |
| C8 | Reserved | NRSS Data Output |

METHOD AND APPARATUS FOR SUPPORTING TWO DIFFERENT TYPES OF INTEGRATED CIRCUIT CARDS WITH A SINGLE CONNECTOR

This application claims the benefit under 35 U.S.C. § 365 of International Application PCT/US00//18893, filed Jul. 12, 2000, which was published in accordance with PCT Article 21(2) on Jan. 25, 2001 in English; and which claims benefit of U.S. provisional application Ser. No. 60/143,843 filed Jul. 15, 1999.

BACKGROUND OF THE DISCLOSURE

1. Field of the Invention

The present invention relates to interfaces in a system using integrated circuit (IC) cards. More particularly, the invention relates to a method and apparatus for supporting two different IC card standards using a single IC card connector.

2. Description of the Background Art

Integrated circuit (IC) cards, such as smart cards, are used in a variety of consumer electronics devices, including pay TV systems, set top cable television boxes, terrestrial television receivers, satellite television receivers and the like. Two types of IC card are based upon the ISO/7816 standard for conventional IC cards and the NRSS standard for IC cards having high-speed data transfer ports. The current IC card systems comprise a connector that is capable of supporting (or operating as an interface to) only one type of IC card. For example, a connector capable of supporting an ISO/7816 card cannot support a NRSS card, and vice versa. In order to support both types of IC cards, the IC card system would require an additional IC card connector. Therefore, a need exists for an IC card interface capable of supporting ISO/7816 and NRSS cards with a single connector.

SUMMARY OF THE INVENTION

The invention overcomes the disadvantages associated with the prior art by providing a method and apparatus capable of receiving ISO/7816 and NRSS cards with a single connector. The apparatus is a computer-controlled device comprising a card reader that further comprises an interface controller and a connector. The connector, which comprises eight pins, forms an interface between the computer controlled device and eight corresponding contacts of the IC card, i.e., contacts C1 through C8. The interface controller determines whether the IC card inserted into the card reader is an ISO/7816 or NRSS card and provides the correct interface for the IC card.

Specifically, an interface controller sends a test signal to the input/output contact (C7) of the IC card and detects this contact (C7) to determine whether the IC card sends a reply or answer signal in response to the test signal. The test signal is selected such that one type of IC card replies to the test signal, while the other type of IC card responds differently, e.g., is non-responsive, to the test signal. Once the interface controller determines the type of IC card, the interface controller implements the correct interface for the detected IC card. For example, the interface may comprise buffers and pull-up resistors. Buffers block selected signals in the connectors (associated with contacts C4, C6 and C8) unless enabled by the interface controller. If the interface controller detects the IC card as a NRSS card, then the interface controller sends a "buffer enable" signal to the buffers. Pull-up resistors are coupled to connectors associated with selected contacts (C4, C6 and C8) on the IC card, in case the IC card is a NRSS card.

The inventive method comprises the steps of determining whether an IC card is an ISO/7816 or NRSS card and implementing an interface for the identified IC card. The determining step further includes the steps of applying a test signal to the IC card and identifying whether the IC card transmits a reply signal in response to the test signal. The implementing step may include blocking or enabling a buffer such that signals are transmitted to selected contacts of one type of IC card (i.e., a NRSS card) and blocked to selected contacts of the other type of IC card (i.e., an ISO/7816 card).

BRIEF DESCRIPTION OF THE DRAWINGS

To facilitate understanding, identical reference numerals have been used, where possible, to designate identical elements that are common to the figures.

DETAILED DESCRIPTION

Figure 1:
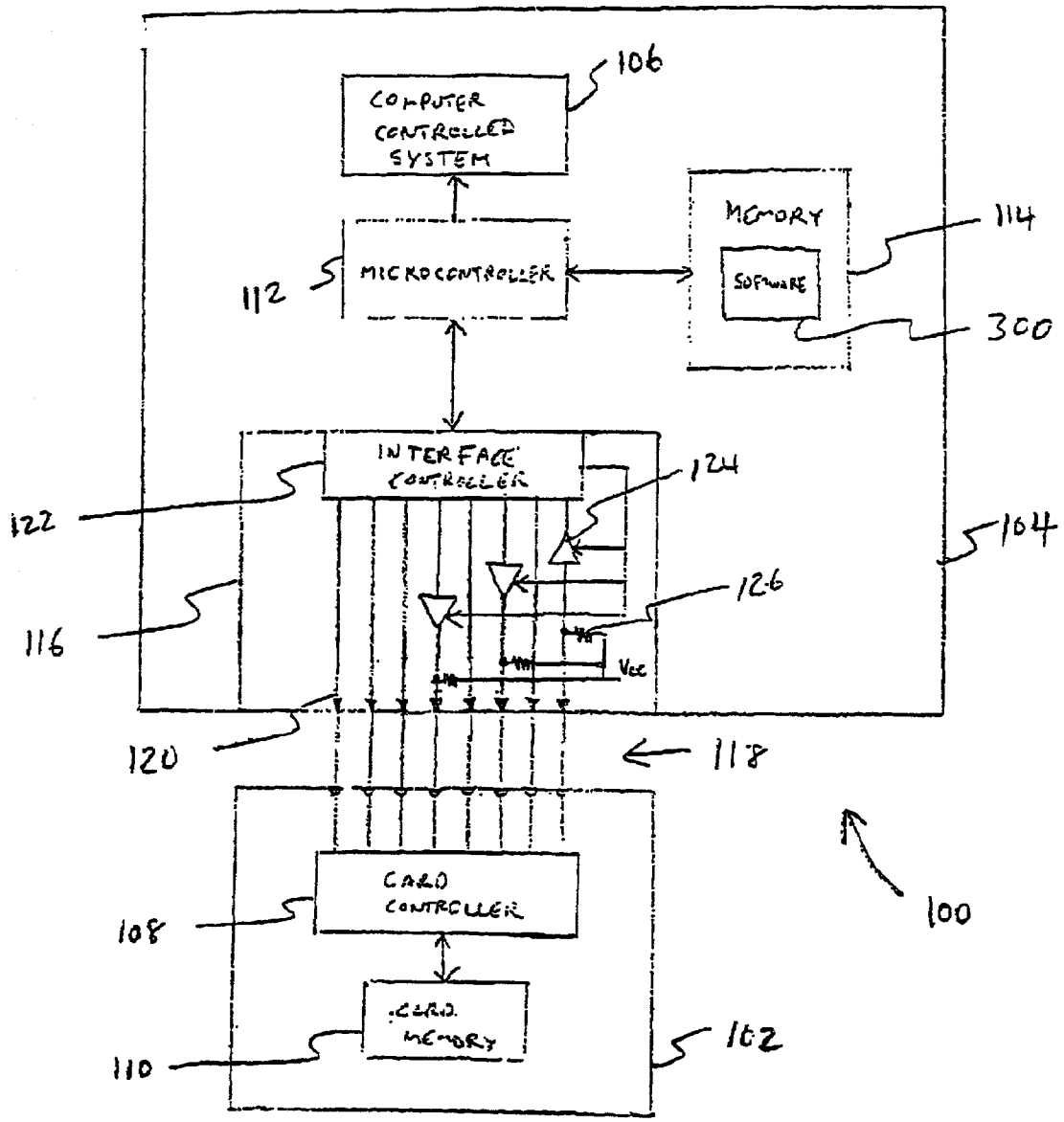
FIG. 1 depicts a block diagram of an integrated circuit (IC) card system including a IC card interface that operates in accordance with the present invention.

FIG. 1 depicts an integrated circuit (IC) card system 100 comprising an IC card 102 and a computer controlled device 104. The IC card 102 is typically a smart card, an access card or a memory card for enabling the computer- controlled device 104 to operate a computer controlled system 106. The IC card 102 comprises a card controller 108 and a card memory 110. The card controller 108 coordinates signal and data transfer between the card memory 110 and the computer controlled device 104.

The IC card 102 includes an arrangement of contacts that generally comply with either the conventional ISO/7816 standard or the NRSS standard for high-speed data transfer. Variations of the ISO/7816 and NRSS cards are contemplated within the scope of the invention.

The computer-controlled device 104 generally includes any device that operates a computer-controlled system 106 upon receipt of the IC card 102. Examples of such computer-controlled devices 104 include a direct broadcast satellite television system, set top cable television boxes for cable and video-on- demand systems, high definition television system, terrestrial television receivers, satellite television receivers and other similar devices.

The computer-controlled device 104 comprises a computer-controlled system 106, a microcontroller 112, a memory 114 and a card reader 116. The microcontroller 112 is a processor that retrieves and executes a card reading software or routine 300 from the memory 114, instructs the card reader 116 to detect the IC card 102 received therein, and activates the computer controlled system 106 upon an acknowledgement from the card reader 116. The computer-controlled system 106 is a system or module that operates the IC card system 100 in response to a signal from the microcontroller 112. The memory 114 stores the card reading routine 300 or method, as well as other applications for implementing the IC card system 100.

The card reader 116 couples the IC card 102 to the computer-controlled device 104 at an interface 115. The card reader 116 comprises a connector 120 and an interface controller 122. The connector 120 comprises eight pins that form the interface 118 between the interface controller 122 and the IC card 102. If the pins are coupled to the contacts of the IC card 102, then these pins form conductive paths for transmitting or receiving signals and data through the interface 118. Additionally, the card reader 116 comprises a buffer 124 and a resistor 126 for further defining the interface 118.

Figures 2, 3:
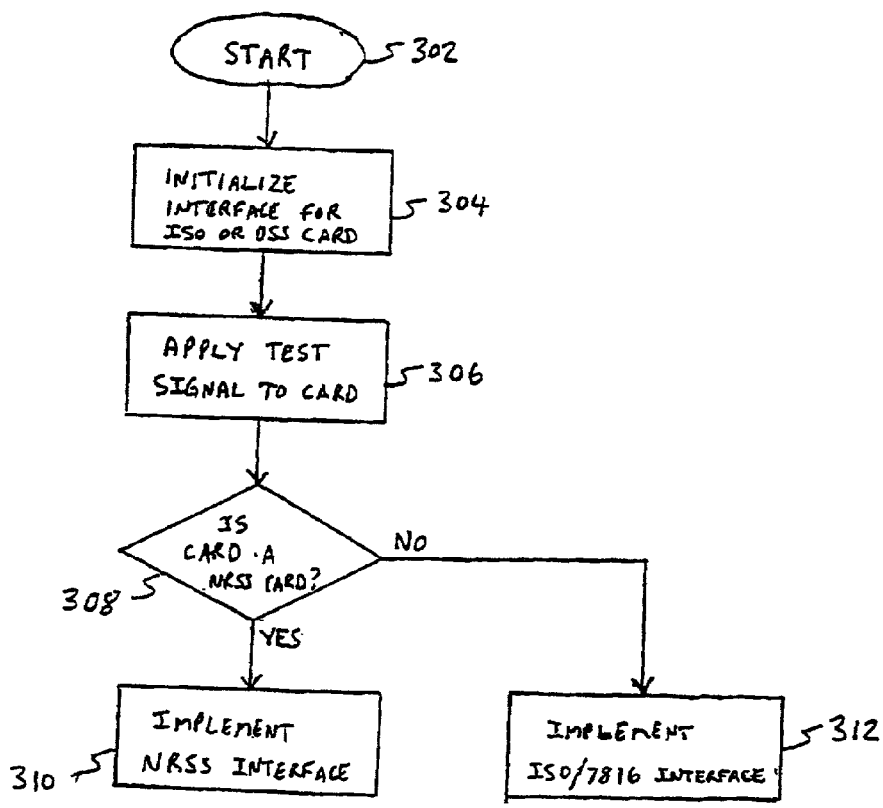
FIG. 2 depicts an assignment of signal contacts on a IC card.
FIG. 3 depicts a flow diagram showing the operation of the present invention.

The signals and data at the interface 118 are typically assigned to the contacts of the ISO/7816 and NRSS cards as depicted in FIG. 2. Five of the contacts have the same assigned signals for the two types of IC cards 102 depicted, namely: supply voltage, reset signal, clock signal, ground and data input/output. Another contact, typically the sixth contact (C6) of the IC card 102, is assigned to a programming signal for the ISO/7816 card and a NRSS clock signal for the NRSS card. The two remaining contacts, typically the fourth and eighth contacts (C4 and C8) on the IC card 102, are undefined for ISO/7816 cards, but represent high speed data input and output paths on NRSS cards.

The buffer 124 is coupled to the interface controller 122 and the pins of the connector associated with contacts C4, C6 and C8 of the IC card 102. Specifically, the buffer 124 may block or disable the conductive path to and from the contacts C4, C6 and C8. If the buffer 124 receives a "buffer enable" signal from the interface controller 122, then the buffer 124 enables the conductive path between the interface controller 122 and contacts C4, C6 and C8 of the IC card 102.

The resistor 126 is coupled to a supply voltage, typically 5 volts, as well as to the pins of the connector associated with contacts C4, C6 and C8 of the IC card 102. If the buffer 124 blocks the conductive path to and from these contacts C4, C6 and C8, the pins associated with these connector are "pulled up" to the supply voltage. In this case, the supply voltage drives the contacts C4, C6 and C8. The pull up resistor 126 is generally of high resistance, such that the effect on the conductive path is minimal when the buffer 124 is enabled, i.e., a "weak" pull-up.

The interface controller 122 is a processor that determines whether the IC card 102 is an ISO/7816 or NRSS card. The interface controller 122 performs this determination while the microcontroller executes the routine or method 300. Once the correct IC card 102 is determined, the interface controller 122 implements the correct interface 118 for the ISO/7816 or NRSS card 102. The steps for determining the type of IC card 102 and implementing the correct interface for the IC card 102 are described with respect to FIG. 3.

FIG. 3 depicts a flow diagram of the routine or method 300 used in the present invention. Specifically, the microcontroller 112 executes the method 300 and the interface controller 122 implements the method 300 for determining whether the received IC card 102 is an ISO 7816 or NRSS card.

Once the IC card 102 is inserted into the card reader 116, the method 300 starts at step 302. At step 304, the method 300 assumes that the received IC card 102 is an ISO/7816 card. At this point, the buffers 124 are disabled for blocking the conductive path to and from contacts C4, C6 and C8 of the IC card 102. The pins associated with these contacts are pulled up to the supply voltage.

At step 306, the method 300 instructs the interface controller 122 to apply a test signal or a reset signal to contact C7 on the IC card 102. The test signal is selected such that the card controller 108 in one type of IC card 102 responds to the test signal, whereas the card controller 108 in the other type of IC card 102 responds differently, e.g., is non-responsive, to the test signal. For example, the test signal or reset signal may elicit a response from the ISO/7816 card and no response from the NRSS card.

At step 308, the interface controller 122 determines whether the received IC card 102 is a NRSS card. Specifically, the interface controller 122 determines whether the card controller 108 of the IC card 102 transmits a reply signal on contact C7. If the selected test or reset signal elicits a response from only an ISO/7816 card, the interface controller 122 checks for the absence of a reply signal from the IC card 102.

If the interface controller 122 identifies the IC card 102 as a NRSS card, the method 300 proceeds to step 310, where the interface controller 122 implements an interface 118 for the NRSS card. In this case, the interface controller 122 sends buffer enable signals to the buffers 124. Once the buffers 124 receive the buffer enable signal, the interface controller 122 may transmit NRSS input data and NRSS clock signals to contacts C4 and C6, and receive NRSS output data from contact C8 of the NRSS card.

If the interface controller 122 identifies the IC card 102 as an ISO/7816 card, the method 300 proceeds to step 312, where the interface controller 122 implements an interface 118 for the ISO/7816 card. In this case, there are no buffer enable signals and the buffers 124 continue to disable the conductive paths to and from contacts C4, C6 and C8 of the ISO/7816 card.

Although one embodiment, which incorporates the teachings of the present invention, has been shown and described in detail herein, those skilled in the art can readily devise many other varied embodiments that still incorporate these teachings.

The invention claimed is:

1. A computer controlled device operable using an integrated circuit (IC) card of a first type or of a second type, the device comprising:

a card reader, coupled to a microcontroller, wherein the card reader receives the IC card, said card reader having an interface controller and operational contacts said interface controller applying a first signal to at least one of the operational contacts of the IC card that is placed in said card reader;

wherein the IC card of the first type responds differently to the first signal than the IC card of the second type, at least one of the IC cards producing a distinct second signal in response to the first signal;

said interface controller determining whether the IC card in the card reader has produced the second signal; and wherein buffers are provided between the interface controller and selected one of said operational contacts are provided for one of blocking and enabling respective signal paths associated with selected ones of said operational contacts to implement an interface for one of the first card and the second card types in response to said determining means.

2. The computer controlled device of claim 1 wherein one of said cards of the first type and of the second type is an ISO/7816 card.

3. The computer controlled device of claim 1 wherein one of said cards of the first type and of the second type is an NRSS type B card.

4. The computer controlled device of claim 1 wherein said card reader applies the first signal to an input/output contact of the IC card and monitors whether the IC card produces the second signal at the input/output contact of the IC card.

5. A method of providing an interface for an integrated circuit (IC) card of a first type or of a second type, the IC card having operational contacts and responding differently to signals applied to their respective operational contacts, the method comprising the steps of:
- providing one reader having an interface controller and operational contacts for receiving the IC card;
- accepting an integrated circuit (IC) card into the reader;
- determining whether the integrated circuit (IC) card in the reader is a card of the first type or a card of the second type by subjecting the card in the reader to a signal and determining whether a responsive signal from the card is characteristic of a card of the first type or a card of the second type; and
- implementing an interface for the identified IC card, wherein at least one signal path to predetermined ones of the operational contacts is enabled, or at least one signal path is disabled to implement an interface for one of the first card and the second card types, as a result of whether the responsive signal was determined to be characteristic of the first type or the second type, wherein operational contacts are enabled and disabled using buffers disposed between said interface controller and selected one of said operational contacts.

6. The method of claim 5 wherein the signal is selected such that a card of one of said first and second types transmits a reply signal in response to the signal and a card of the other of said first and second types is non-responsive to the signal.

7. The method of claim 5 wherein the signal is a reset signal.

8. The method of claim 5 wherein said implementing step comprises the step of disabling selected contacts of the IC card if said determining step identifies the IC card as a card of one of said two types.

9. The method of claim 5 wherein said implementing step comprises the step of enabling selected contacts of the IC card if said determining step identifies the IC card as a card of one of said two types.

10. The method of claim 5 wherein one of said types is ISO/7816.

11. The method of claim 5 wherein one of said types is NRSS type B.

* * * * *